2,811,559

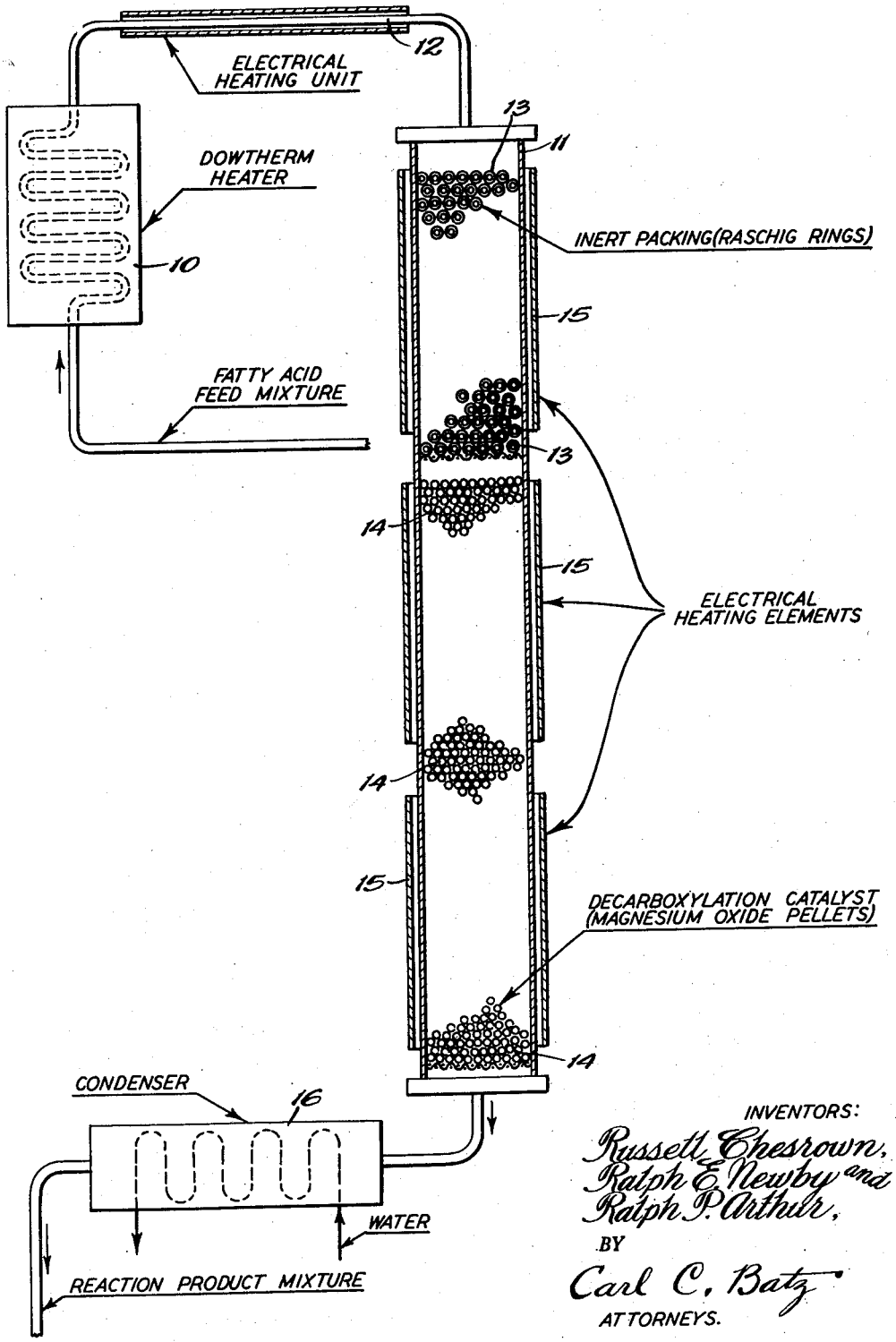

METHOD OF DECARBOXYLATING HIGHER FATTY ACIDS OVER MAGNESIUM CATALYSTS

Russell Chesrown, Chicago, Ralph E. Newby, Steger, and Ralph P. Arthur, Chicago, Ill., assignors to Armour and Company, Chicago, Ill., a corporation of Illinois Application October 22, 1954, Serial No. 463,844

5 Claims. (Cl. 260—595)

This invention relates to a method of decarboxylating higher fatty acids over magnesium catalysts, which method is particularly characterized by the conservation of the magnesium catalysts.

It has been known heretofore that aliphatic aldehydes and ketones could be produced by reacting fatty acids at high temperatures over decarboxylation catalysts such as magnesium oxide or magnesium hydroxide catalysts. The production of aliphatic aldehydes and ketones by this process, however, has not gone into commercial use, as far as applicants are aware. One problem which has been encountered is that the magnesium catalysts have an undesirably short life when employed for decarboxylating higher fatty acids. During the course of the reaction, the magnesium catalysts are apparently attacked in some way so that there is an eroding of the catalyst surfaces, which tends to lower the efficiency of the catalysts and to cause plugging of the reaction column. For these reasons it would have been expected that an excessive amount of a magnesium catalyst would have been required in large-scale commercial operations involving the decarboxylation of higher fatty acids. Further, the best available magnesium catalysts are rather expensive, being prepared from highly purified magnesium compounds and being formed into pellets for use as a catalyst.

It is therefore a general object of this invention to provide a method for conserving magnesium catalysts in the decarboxylation of higher fatty acids. More specifically, it is an object of this invention to provide a method for the production of aliphatic aldehydes and ketones by the decarboxylation of higher fatty acids over magnesium catalysts, which method is characterized by increasing the effective life of the catalyst, preventing plugging of the reaction column, and by sustained reaction efficiency over long periods of time. Further objects and advantages will appear as the specification proceeds.

This invention is based in part on the recognition that under certain temperature conditions in the decarboxylation of higher fatty acids over magnesium catalysts, the higher fatty acids are first converted to magnesium soaps prior to their decarboxylation, and that it is the formation of these intermediate compounds which causes most of the difficulties described above. We have further discovered that the formation of magnesium soaps can be prevented by using critically high temperatures at which the fatty acids are decarboxylated on contact with the magnesium catalysts instead of first being converted to magnesium soaps. We have also worked out the temperatures required to accomplish the result of preventing the formation of soaps to any appreciable extent in the decarboxylation of higher fatty acids over magnesium catalysts.

In practicing the method of this invention a feed mixture containing as one principal ingredient fatty acids having from 8 to 22 carbon atoms is heated to a temperature of at least 340° C., before being brought into contact with the catalyst. The magnesium decarboxylation catalyst is also heated to a temperature of at least 340° C., and then the heated feed mixture is brought into contact with the catalyst to decarboxylate the fatty acids therein without the formation of soaps to any appreciable extent.

As indicated above, this method is adapted for use with any magnesium decarboxylation catalyst, but it is preferably employed with magnesium oxide or magnesium hydroxide decarboxylation catalysts. While the benefits of the invention are largely achieved by using temperatures above 340° C., optimum results from the standpoint of precluding the formation of soaps are obtained at temperatures above 360° C., that is, the feed mixture is preferably heated to a temperature of at least 360° C. and is then brought into contact with the magnesium catalyst which has also been previously heated to a temperature of at least 360° C. Further, we prefer to practice the method with at least one of the reactants comprising fatty acids having from 12 to 18 carbon atoms, such as the fatty acids which are commonly formed into soaps by saponification.

The method of this invention will probably find its greatest utility in the production of aliphatic aldehydes and ketones by the reaction of fatty acids containing from 8 to 22 carbon atoms with fatty acids containing from 1 to 22 carbon atoms. For example, methyl aliphatic ketones can be produced by reacting acetic acid with fatty acids containing from 8 to 22 carbon atoms, or the higher fatty acids can be reacted with themselves to produce compounds such as stearone, which is the symmetrical ketone formed from stearic acid. As a further example, aliphatic aldehydes can be obtained by reacting formic acid with a higher fatty acid.

While the upper temperature limits employed in the process have not been found to be critical for preventing the formation of magnesium soaps, they are important for obtaining good results, since if too high a temperature is employed there will be some loss of product due to the pyrolysis or splitting of the hydrocarbon chains of the higher fatty acids. Therefore, it is preferred to maintain the feed mixture and the catalyst below a temperature at which substantial pyrolysis occurs of the hydrocarbon chains of the higher fatty acids. While temperatures up to 425° C. can be employed with some degree of success, it is preferred to maintain the temperatures below 400° C.

While various procedures can be employed for carrying out the reaction in the manner described above, the procedure illustrated in the accompanying flow sheet has been found to be particularly advantageous. This procedure is characterized by introducing the feed mixture containing the higher fatty acids into a column reactor wherein it is first passed through a bed of an inert material and thereafter through a bed of the magnesium catalyst. Both of the beds are continually heated while the feed mixture is being passed therethrough, the feed mixture being heated in the bed of inert material to a temperature of at least 300° C. before passing into the catalyst bed, and the catalyst bed being maintained at a temperature above 340° C. but below a temperature at which any substantial degree of pyrolysis occurs. More specifically, as shown in the accompanying flow sheet, the fatty acid feed is passed through a Dowtherm heat exchanger 10 and then into the top of a vertically-extending reaction column 11 through an electrically heated feed pipe 12. The upper portion of column 11 is filled with an inert material 13, such as a ceramic column packing like the well known Raschig rings. Below the bed of material 13 the column is provided with a catalyst bed 14 which can be, for example, magnesium oxide pellets. Column 11 is provided with a plurality of electrical heating units 15 which are operative to heat both inert packing material 13 and the catalyst 14. The heat supplied to these two sections of column 11 by heating units 15 is controlled so that the feed material reaches a temperature of at least 340° C. and preferably 360°

C., before passing from the section containing the inert material to the section containing the magnesium catalyst. Further, the catalyst is maintained at a correspondingly high temperature, that is, at a temperature of at least 340° C. and preferably above 360° C. In the illustration given, the reactants are discharged from the bottom of column 11 and passed through a water-cooled condenser 16.

The method of this invention is further illustrated by the following specific examples:

Example I

In accordance with the method of this invention as described above, a mixture of lauric acid and acetic acid was reacted to produce methyl undecyl ketone over a magnesium oxide catalyst. Preheating of the feed was employed for the purposes already indicated. The operating data and results are summarized below:

Feed temperature: 360–370° C.
Catalyst: Magnesium oxide 25 lbs. 0.255 cu. ft. (The catalyst bed was 5.1 ft. deep.)
Heating section:
  Raschig rings ¼″, 3 lbs.
  The heating section was 1.1 ft. deep.
Catalyst temperature: 370–380° C.
Feed:
  Lauric acid, 243 lbs.
  Acetic acid, 365 lbs.
Time: 145 hours.
Yield: Crude methyl undecyl ketone 249 lbs.
Analysis:
  Lauric acid, 4.5%
  Laurone, 6.0%
  Methyl undecyl ketone, 84.0%

At this point the catalyst was removed and found to be in excellent condition and was capable of being used for a longer period.

Example II

Following the same procedure as employed in Example I except for the preheating of the feed mixture, a comparative test was made. The operating data and results of this test are set out below:

Feed temperature: 150° C.
Catalyst: Magnesium oxide 31.5 lbs. 0.32 cu. ft. (The catalyst bed was 6.6 feet deep.)
Catalyst temperature: 325–380° C.
Feed:
  Lauric acid, 17 lbs.
  Acetic acid, 26 lbs.
Time: 13.5 hrs.
Yield: Crude methyl undecyl ketone 10.1 lbs.
Analysis:
  Lauric acid, 3.5%
  Laurone, 7.0%
  Methyl undecyl ketone, 77.0%

At this point the catalyst was blocked and could not be regenerated.

Example III

A further experiment conducted in accordance with the method of this invention is summarized below:

Catalyst: Magnesium oxide, 2400 grams
Vaporizer temperature: 280–300° C.
Catalyst temperature: 340–370° C.
Pressure: 10–20 cm. Hg
Feed:
  Lauric acid, 3000 grams
  (90%) formic acid, 1800 grams
Time: 24 hours
Yield: 1800 grams crude lauraldehyde
Analysis:
  Lauric acid, 19%
  Laurone, 12%
  Lauraldehyde, 69%

Example IV

Another experiment similar to Example III is summarized by the following tabulation:

Catalyst: Magnesium oxide, 2400 grams
Vaporizer temperature: 270–300° C.
Catalyst temperature: 340–370° C.
Pressure: 5–10 cm. Hg
Feed:
  Stearic acid, 2536 grams
  (90%) formic acid, 900 grams
Time: 18 hours
Analysis:
  Stearic acid, 6.9%
  Stearone, 11.8%
  Stearaldehyde, 76.0% (56% as free aldehyde; 20% as condensation product)

While in the foregoing specification this invention has been described in relation to specific embodiments thereof and many details have been set forth for purpose of illustration, it will be apparent to those skilled in the art that the invention is susceptible to other embodiments and that many of the details set forth can be varied widely without departing from the basic concepts of the invention.

We claim:

1. The method of conserving magnesium catalysts in the decarboxylation of higher fatty acids, comprising heating a feed mixture containing as one of the principal ingredients fatty acids having from 8 to 22 carbon atoms to a temperature of at least 340° C., also heating a magnesium decarboxylation catalyst to a temperature of at least 340° C., and then bringing said feed mixture into contact with said catalyst to decarboxylate said fatty acids therein without the formation of soaps to any appreciable extent.

2. The method of conserving a magnesium oxide catalyst in the decarboxylation of fatty acids having from 12 to 18 carbon atoms, comprising heating a feed mixture containing as one principal ingredient said fatty acids to a temperature of from 360 to 400° C. before contacting said mixture with said magnesium oxide catalyst, also heating said magnesium oxide catalyst to a temperature within said range of from 360 to 400° C., then bringing said feed mixture into contact with said catalyst while maintaining both said feed mixture and said catalyst at a temperature of from 360 to 400° C., whereby said fatty acids are decarboxylated without the formation of magnesium soaps.

3. In a process for preparing aliphatic aldehydes, the steps of heating a mixture of formic acid and fatty acids containing from 8 to 22 carbon atoms to a temperature of at least 340° C., also heating a magnesium decarboxylation catalyst to a temperature of at least 340° C., said catalyst being selected from the group consisting of magnesium oxide and magnesium hydroxide decarboxylation catalysts, and then bringing said feed mixture into contact with said catalyst to decarboxylate said fatty acids therein without the formation of soaps to any appreciable extent, said fatty acids being maintained below a temperature at which substantial pyrolysis occurs of the hydrocarbon chains of said fatty acids.

4. In a process for preparing methyl aliphatic ketones, the steps of heating a mixture of acetic acid and fatty acids containing from 8 to 22 carbon atoms to a temperature of at least 340° C., also heating a magnesium decarboxylation catalyst to a temperature of at least 340° C., said catalyst being selected from the group consisting of magnesium oxide and magnesium hydroxide decarboxylation catalysts, and then bringing said feed mixture into contact with said catalyst to decarboxylate said fatty acids therein without the formation of soaps to any appreciable extent, said fatty acids being maintained below a temperature at which substantial pyrolysis occurs of the hydrocarbon chains of said fatty acids.

5. In a process for decarboxylating fatty acids containing from 8 to 22 carbon atoms, the steps of introducing a feed mixture containing said fatty acids into a column reactor, passing said feed mixture first through a bed of an inert material within said column reactor, and then through a bed of a magnesium decarboxylation catalyst within the same column reactor, both of said beds being continually heated during said passing steps, the feed mixture being heated in said bed of inert material to a temperature of at least 340° C. before passing into said catalyst bed, and said catalyst bed being maintained at a temperature above 340° C. but below a temperature at which the hydrocarbon chains of said fatty acids are split to any substantial extent.

References Cited in the file of this patent

UNITED STATES PATENTS

| | | |
|---|---|---|
| 1,988,021 | Schmidt et al. | Jan. 15, 1935 |
| 2,612,524 | Zettlemoyer et al. | Sept. 30, 1952 |

OTHER REFERENCES

Curtis et al., Chem. Abstracts 42, page 3726 (1948).